(12) United States Patent
Tetsushi

(10) Patent No.: US 6,198,820 B1
(45) Date of Patent: Mar. 6, 2001

(54) PORTABLE REMOTE TERMINAL APPARATUS

(75) Inventor: Kumamoto Tetsushi, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 08/992,413

(22) Filed: Dec. 17, 1997

(30) Foreign Application Priority Data

Dec. 18, 1996 (JP) .................................................. 8-354097
Jan. 30, 1997 (JP) .................................................. 9-031090

(51) Int. Cl.[7] ............................. H04M 1/00; H04Q 7/20
(52) U.S. Cl. ............................ 379/413; 455/550; 455/574
(58) Field of Search ................................... 379/413, 361, 379/418; 455/574, 312, 466; 713/322, 501

(56) References Cited

U.S. PATENT DOCUMENTS

| | | | |
|---|---|---|---|
| 5,758,132 | * 5/1998 | Strahlin ................................ | 713/501 |
| 5,842,141 | * 11/1998 | Vaihoja et al. ...................... | 455/574 |
| 5,872,960 | * 2/1999 | Oz et al. ............................... | 713/501 |
| 5,909,585 | * 6/1999 | Shinmiya ............................. | 713/322 |

* cited by examiner

Primary Examiner—Wing F. Chan
(74) Attorney, Agent, or Firm—Hogan & Hartson, LLP

(57) ABSTRACT

The portable remote terminal apparatus comprises a CPU, a clock oscillating means and a keyboard for operation, and is arranged to execute communication in a time sharing system. In the present portable remote terminal apparatus, there are provided key input detecting circuit for detecting that the keyboard has been operated, and an interrupt controller; and, when the present portable remote terminal apparatus is put into an intermittent receiving state, the CPU outputs a stop signal to thereby stop the operation of the clock oscillating means so that the CPU is switched over into the sleep mode, if the keyboard is operated, then the key input detecting circuit detects such keyboard operation so that it not only transmits data to the CPU but also outputs a signal to the interrupt controller, in response to this, the interrupt controller activates the clock oscillating means, and, after the output of the clock oscillating means is stabilized, a clock signal is supplied to the CPU and a signal is transmitted to the CPU so that the CPU is switched from the sleep mode over to the normal mode.

6 Claims, 11 Drawing Sheets

FIG. 5

| BAUD RATES (bps) | EXTERNAL CLOCKS USED | DEGREE OF ACCURACY (%) |
|---|---|---|
| 600 | 32.768KHz | 1 |
| 1200 | 12.6MHz | 0 |
| 2400 | 32.768KHz | 1 |
| 4800 | 12.6MHz | 0 |
| 9600 | 12.6MHz | 0 |
| 19200 | 12.6MHz | 0 |
| 38400 | 12.6MHz | 2.3 |

PORTABLE REMOTE TERMINAL APPARATUS

BACKGROUND OF THE INVENTION

The present invention relates to a portable remote terminal apparatus such as a portable telephone and the like and, in particular, to a portable remote terminal apparatus which can reduce the power consumption thereof.

FIG. 13 is a block diagram of the structure of an ordinary portable remote terminal apparatus according to the prior art. As shown in FIG. 13, the present conventional portable remote terminal apparatus comprises an antenna 71c used for communication with a base station, an RF section 72c which performs a high-frequency signal processing, a digital processing section 73c which performs a digital data processing, an operation section 74c including a push button and the like, and an audio section 75c including a microphone/speaker section and the like.

The digital processing section 73c includes a high-speed CPU (Central Processing Unit), while the digital processing section 73c not only executes digital data processings such as a speed signal encoding/decoding processing, a transmission line encoding/decoding processing, a TDMA timing control processing, a protocol processing, a clock control processing, and a man-machine I/F control processing, but also controls the whole of the present portable remote terminal apparatus.

In a portable remote terminal apparatus such as a portable telephone of a PHS type, a portable telephone of a PDC (Personal Digital Cellular) type and the like, normally, there is employed a TDMA (Time Division Multiple Access) system, in which a user communicates with a base station using a control channel, registers his or her own whereabouts, and responds to a call from the base station. However, in this type of portable remote terminal apparatus, normally, call-receiving from the base station is not successively executed but, for example, in the portable telephone of a PDC type, receiving is executed intermittently from the base station. And, in such intermittent receiving state, the user communicates with the base station in such a manner that receiving is executed at a rate of a receiving period of 6.6 ms (=1 slot) per call in up to thirty six subframes (one subframe=20 ms).

Conventionally, most of the portable remote terminal apparatuses employ a battery as their drive sources and thus it is desired that the power consumption thereof is as small as possible. As means for reducing the power consumption of the portable remote terminal apparatus, there has been employed a method in which, when the portable remote terminal apparatus is in a wait state and in an intermittent receiving state, the CPU of the portable remote terminal apparatus is set into a sleep mode to thereby stop the supply of a clock, or a method in which, in the above-mentioned case, the CPU of the portable remote terminal apparatus is set into a sleep mode to thereby lower the frequency of the clock.

Also, even when the CPU is set in the sleep mode, the CPU is returned to a normal mode at a given cycle in order to detect a call from the corresponding terminal apparatus thereof, and executes a detect operation to detect whether a keyboard is pressed down or not. If the keyboard is pressed down, then the CPU scans keys, recognizes and processes a key which is pressed down, and, after then, turns into the sleep mode again; that is, this series of operations are executed repeatedly.

However, in the above-mentioned conventional portable remote terminal apparatuses, as described above, since the CPU detects the key depressing even during the intermittent receiving period, the CPU returns from the sleep mode to the normal mode at a given cycle for scanning, which increases the power consumption of the portable remote terminal apparatus during such operation. Also, if the clock oscillator is stopped even during the intermittent reception, then there occurs an initial unstable period in the output when the oscillation is resumed, and it is difficult to match the clock oscillation to the timing of a receiving signal. In view of this, during the intermittent reception, although the clock supply to the CPU is being stopped, the operation of the oscillator is not stopped. This results in the increased power consumption of the clock oscillator.

Further, FIG. 6 is a block diagram of the structure of a portable remote terminal apparatus according to the prior art. Here, the portable remote terminal apparatus shown in FIG. 6 consists mainly of a communication function section and a data transmission function section: in particular, the communication function section is composed of an antenna 4b, an RF/IF section (high-frequency/intermediate-frequency section) 5b, a digital processing section 6b, an operation section 7b, an audio processing section 8b, a microphone/speaker 9b, and the like; and, the data transmission function section is composed of a UART (a start-stop synchronous data transmit-receive section) 1b, a high-frequency clock oscillator 2b for driving the UART 1b, an external interface 3b, and the like.

The digital processing section 6b comprises a high-speed CPU (central processing unit) 6b-2, a memory 6b-3, and a clock oscillator 6b-1 for a clock, and is structured such that it not only executes digital data processings such as an audio signal encoding/decoding processing, a protocol processing, a clock control processing, a control signal processing, but also controls the whole of the present portable remote terminal apparatus.

Also, when a transmission system is a start-stop synchronous system, a transmission speed (baud rate) is selected properly out of 600, 1200, 2400, 4800, 9600, 19200, 38400 bps according to the functions of lines or equipment used, while the accuracy of a sampling clock and a baud rate clock must be secured within ±1%, and, therefore, the UART 1b is structured such that it can be operated by an output signal of a 12.6 MHz high frequency output from the high-frequency clock oscillator 2b. Also, the external interface 3b is an interface which is used to connect the present portable remote terminal apparatus with an external device.

In the above-mentioned conventional portable remote terminal apparatus, as described above, during the intermittent receiving operation, the CPU 6b-2 is set into the sleep mode thereof to stop the supply of the operation clock or lower the frequency of the operation clock, thereby being able to reduce the current consumption of the CPU 6b-2. However, since the UART 1b uses the high-frequency clock oscillator 2b of 12.6 MHz regardless of the transmission speed (baud rate), the current consumption increases during the data transmission operation (because the current consumption is in proportion to the frequency used).

However, in the above-mentioned conventional portable remote terminal apparatus, even when the sleep mode (operation stop state) of the CPU continues for a long time in the intermittent receiving state, a clock oscillating source (an oscillator which oscillates a clock of high frequencies ranging from several MHz to several tens of MHz) is always held in the oscillating state, not only in order to match the clock oscillation to the timing of a receiving signal, but also because, once the clock oscillating source is stopped, when resuming the operation of the clock oscillating source, it takes time before the oscillation thereof is stabilized, which results in the wrong timing. Also, the present clock oscillating source requires the power consumption up to several mA and thus it wastefully consumes the power of a battery which is the drive power source of the portable remote terminal apparatus.

Also, according to the system structure of the conventional portable remote terminal apparatus, even in a block including a clock oscillator such as a PLL synthesizer, a VCO and the like built into the RF/IF control section of the portable remote terminal apparatus, to set the clock oscillator into an oscillating state during the intermittent receiving operation requires the current consumption, which wastes the power of a battery serving as the drive power source of the portable remote terminal apparatus.

SUMMARY OF THE INVENTION

The present invention aims at eliminating the above-mentioned drawbacks found in the conventional portable remote terminal apparatuses. Accordingly, it is an object of the invention to provide a portable remote terminal apparatus which detects the operation of a keyboard and actuates a clock oscillator to thereby be able to reduce the power consumption thereof.

In attaining the above object, according to the invention of the first aspect, there is provided a portable remote terminal apparatus which comprises a CPU having an operation mode consisting of a sleep mode and a normal mode and actuable by means of a high-frequency clock signal, a clock oscillating section for oscillating the present clock signal, and a keyboard for operation, and also which communicates in a time sharing system by means of the present clock signal, wherein there are further provided key input detecting means for detecting that the keyboard has been operated, and an interrupt controller, and also wherein the present portable remote terminal apparatus is put into an intermittent receiving state, the CPU outputs a stop signal to thereby stop the operation of the clock oscillating section so that the CPU is switched over into the sleep mode and, if the keyboard is operated, then the key input detecting means detects such keyboard operation so that it not only transmits data to the CPU but also outputs a signal to the interrupt controller, in response to this, the interrupt controller activates the clock oscillating section, and, after the output of the clock oscillating section is stabilized, a clock signal is supplied to the CPU and a signal is transmitted to the CPU so that the CPU is switched from the sleep mode over to the normal mode.

Further, the present invention aims at eliminating the drawbacks found in the above-mentioned conventional portable remote terminal apparatus. Accordingly, it is an object of the invention to provide a portable remote terminal apparatus which switches a low-frequency clock oscillator and a high-frequency clock oscillator over to each other to thereby be able to reduce the power consumption thereof.

In attaining the above object, according to the invention of the second aspect, there is provided a portable remote terminal apparatus which comprises a low-frequency clock oscillator for clock and a high-frequency clock oscillator for transmission as well as start-stop synchronous data transmission means which can cope with various transmission speeds specified, characterized by switching means which can switch the outputs of the low-frequency clock oscillator for clock and the high-frequency clock oscillator over to each other according to a data transmission speed, frequency divider means which is used to divide the output frequencies of the two high- and low-frequency clock oscillators, and data transmission means which, when transmitting data at a given data transmission speed, stops the operation of the high-frequency clock oscillator, and divides the output signal of the low-frequency clock oscillator for clock properly by use of the frequency divider means to generate a sampling clock and a baud rate clock each having a given degree of accuracy, thereby being able to transmit the data properly.

Still further, the present invention aims at eliminating the drawbacks found in the above-mentioned conventional portable remote terminal apparatus. Accordingly, it is an object of the invention to provide a portable remote terminal apparatus which, while it is in an intermittent receiving state and also while the CPU thereof is held in a sleep mode, stops the operations of a high-frequency clock oscillator for supplying an operation clock to the CPU and the clock oscillator of another block to thereby be able to further reduce the power consumption thereof.

In attaining the above object, according the invention of the third aspect, there is provided a portable remote terminal apparatus which comprises a CPU having a sleep mode, as well as a high-frequency clock oscillating source for oscillating an operation clock for the CPU and a low-frequency clock for oscillating a clock having a lower frequency than the operation clock, and also which is structured such that it divides the frequency of the clock of the high-frequency clock oscillating source to thereby generate a clock for tracing and thus execute communication in a time sharing system. The present portable remote terminal apparatus is characterized by control means which, when switching the portable remote terminal apparatus over to an intermittent receiving state, controls the CPU such that the CPU not only sets an intermittent mode and, simultaneously with this, sets a return timing in consideration of the oscillation stabilizing time of the high-frequency clock oscillating source and, at the same time with such setting of the intermittent mode and return timing, stops the oscillating operation of the high-frequency clock oscillating source, but also the CPU itself turns into the above-mentioned sleep mode, and also which counts clocks output from the low-frequency clock oscillating source instead of tracing clocks obtained by frequency dividing clocks output from the high-frequency clock oscillating source and, if the count reaches the return timing, then generates a return trigger signal to thereby operate the high-frequency clock oscillating source so as to return the CPU to the normal mode thereof.

Also, according to the invention of the fourth aspect, in a portable remote terminal apparatus of the third aspect, there are further included another structure block having a clock oscillating source, and power source control means which, when the intermittent mode is set by the CPU, cuts off the power source of the present structure block at a given timing, and thereafter generates the return trigger signal to thereby return the structure block power source.

BRIEF DESCRIPTION OF THE DRAWINGS

FIG. 5 is a view of the degrees of accuracy of baud rates when a dual clock signal is used in combination;

DETAILED DESCRIPTION OF THE PREFERRED EMBODIMENTS

Embodiment 1

Figure 1:
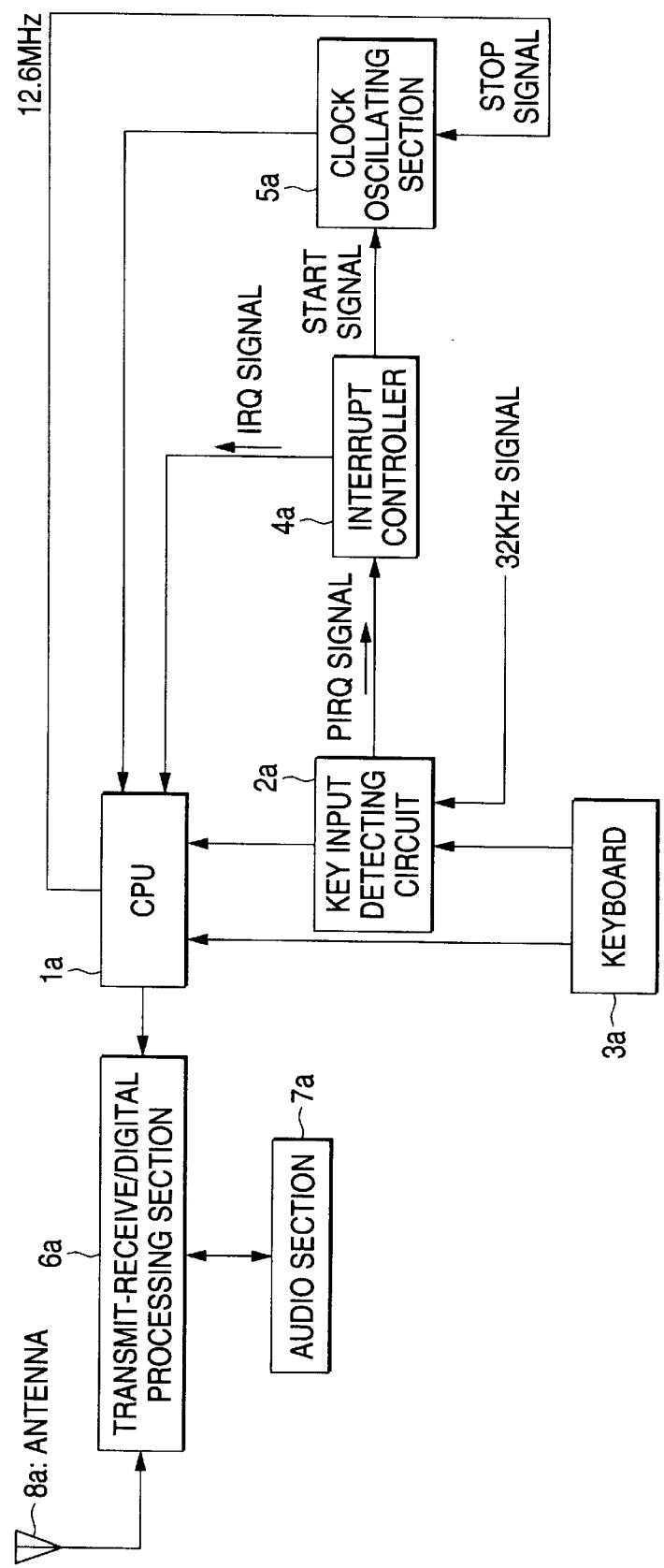
FIG. 1 is a block diagram of the structure of a portable remote terminal apparatus according to the invention.

Now, description will be given below in detail of an embodiment of a portable remote terminal apparatus according to the invention with reference to the accompanying drawings. In particular, FIG. 1 is a block diagram of the structure of a portable remote terminal apparatus according to the invention. As shown in FIG. 1, the portable remote terminal apparatus according to the invention comprises a CPU 1a, a key input detecting circuit 2a, a keyboard 3a, an interrupt controller 4a, a clock oscillating section 5a of 12.6 MHz, a transmit-receive section/digital processing section 6a, an audio section 7a, and an antenna 8a.

In a normal receiving state (during communication), the present portable remote terminal apparatus transmits and receives an electric wave from a base station by means of the antenna 8a, while a received signal is processed in the transmit-receive section/digital processing section 6a, so that communication can be executed through the speaker/microphone of the audio section 7a. The operation of the present portable remote terminal apparatus is carried out through the keyboard 3a and the whole of the present portable remote terminal apparatus is controlled by the output of the CPU 1a. The present invention relates to the start/stop of the clock oscillating section 5a which is used to actuate the CPU 1a. In particular, the invention is characterized in that there are provided the key input detecting circuit 2a for detecting the presence or absence of input of the keyboard 3a, and the interrupt controller 4a, and also that, if the keyboard 3a is operated, then the clock oscillating section 5a of 12.6 MHz is automatically activated and a clock signal is thereby supplied to the CPU 1a.

Figure 2:
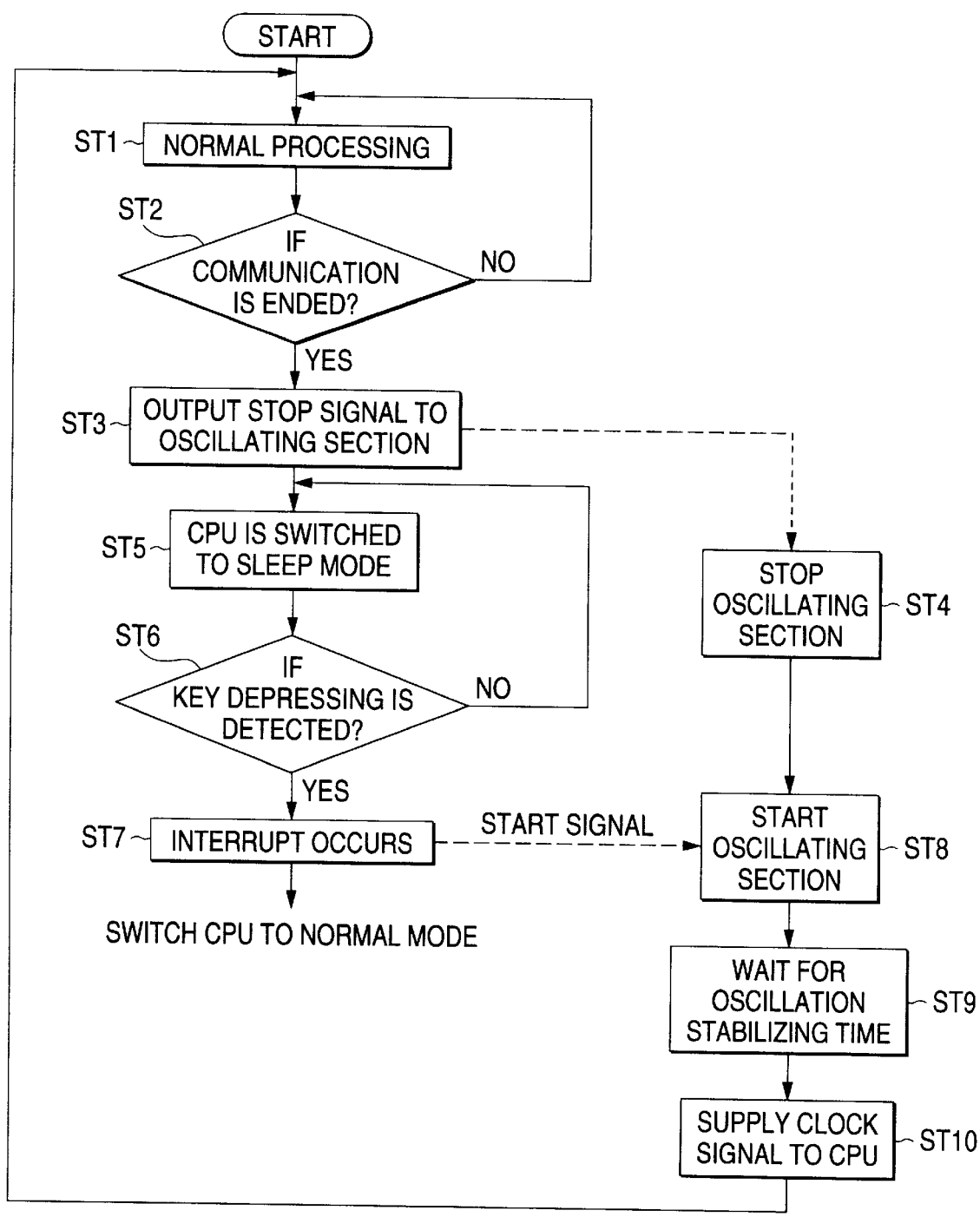
FIG. 2 is a flow chart of the operation of the above portable remote terminal apparatus when it is in the intermittent receiving state.

Now, FIG. 2 shows a flow chart of the operation of the present portable remote terminal apparatus while it is held in an intermittent receiving state. Description will be given below of the operation of the present portable remote terminal apparatus with reference to FIG. 2. At first, the CPU 1a, in the normal receiving state, is operated by a clock signal of 12.6 MHz and performs normal processings such as an input processing from the keyboard 3a, a receiving processing and the like (Step ST1). And, the CPU judges whether communication is ended or not (Step ST2), and, if the communication is ended, then the CPU 1a transmits a stop signal to the clock oscillating section 5a (Step ST3), whereby the operation of the clock oscillating section 5a is stopped and the supply of the clock signal of 12.6 MHz to the CPU 1a is stopped (Step ST4). As a result of this, the CPU 1a is switched over into the sleep mode (Step ST5) thereof.

While the CPU 1a holds the output port in a low level, if the CPU 1a detects that any key of the keyboard 3a is pressed down (Step ST6), then the CPU 1a recognizes the key depressing by means of the output of the key input detecting circuit 2a. Data is transmitted from the key input detecting circuit 2a to the CPU 1a and a PIRQ (pre-interrupt) signal is tranmitted to the interrupt controller 4a (Step ST7). During this operation, the oscillation of 12.6 MHz is stopped but the clock (for counting) of 32 KHz is in operation, so that the PIRQ signal can be generated by the present clock signal.

On receiving the PIRQ signal, the interrupt controller 4a outputs a start signal to thereby start the clock oscillating section 5a (Step ST8). After waiting for a time during which the output signal of 12.6 MHz from the clock oscillating section 5a can be stabilized (Step ST9), the clock signal of 12.6 MHz is supplied to the CPU 1a (Step ST10). Also, the interrupt controller 4a outputs an IRQ (interrupt) signal after the passage of the oscillation stabilizing time to thereby switch the CPU 1a from the sleep mode over to the normal mode. After then, the present procedure is executed repeatedly from Step 1.

As described above, according to the present embodiment, there are provided the key input detecting circuit 2a and interrupt controller 4a, only if the keyboard 3a is operated, the clock oscillating section 5a can be actuated, so that not only the clock signal of 12.6 MHz can be supplied to the CPU 1a but also the CPU 1a can be switched from the sleep mode over to the normal mode. Due to this, it is not necessary to scan the key cyclically during the intermittent receiving operation, and also the driving of the clock oscillating section 5a is stopped, which in turn can reduce the amount of current consumption.

As has been described heretofore, according to the invention, there are provided key input detecting means for detecting that the keyboard has been operated, and an interrupt controller, when the present portable remote terminal apparatus is put into an intermittent receiving state, the CPU outputs a stop signal to thereby stop the operation of the clock oscillating section so that the CPU is switched over into the sleep mode, if the keyboard is operated, then the key input detecting means detects such keyboard operation so that it not only transmits data to the CPU but also outputs a signal to the interrupt controller, in response to this, the interrupt controller activates the clock oscillating section, and, after the output of the clock oscillating section is stabilized, a clock signal is supplied to the CPU and a signal is transmitted to the CPU so that the CPU is switched from the sleep mode over to the normal mode. This makes it possible to reduce both of the amounts of the operating current of the CPU and the operating current of the clock oscillating section.

Also, according to the invention of the first aspect, since there is eliminated the need to scan the keyboard at a given cycle, which has been necessary in the conventional portable remote terminal apparatuses, the time of the sleep mode of the CPU can be lengthened and the current consumption thereof can also be reduced.

Embodiment 2

Figure 3:
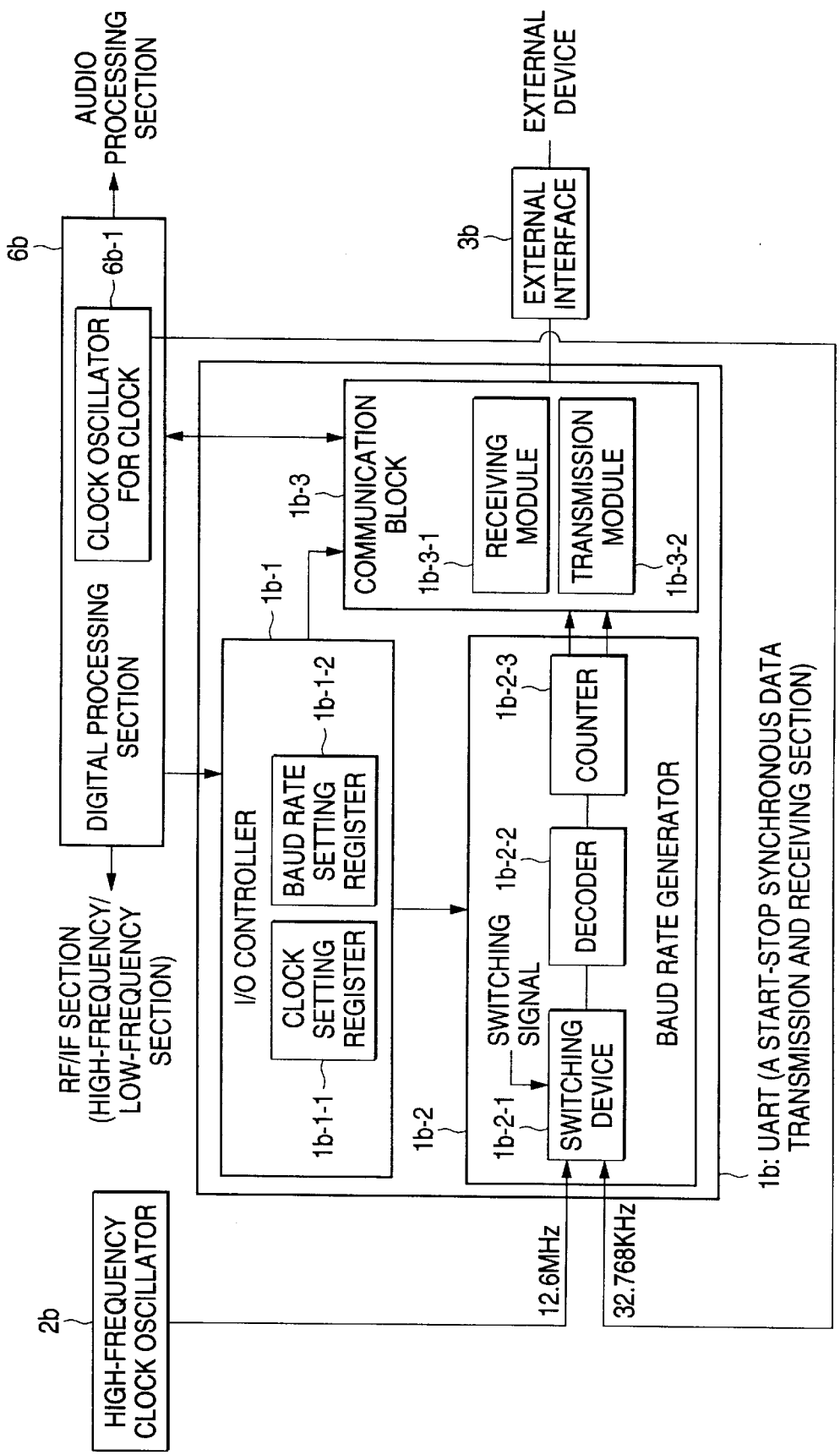
FIG. 3 is a block diagram of the structure of an embodiment of a portable remote terminal apparatus according to the invention.
Figure 6:
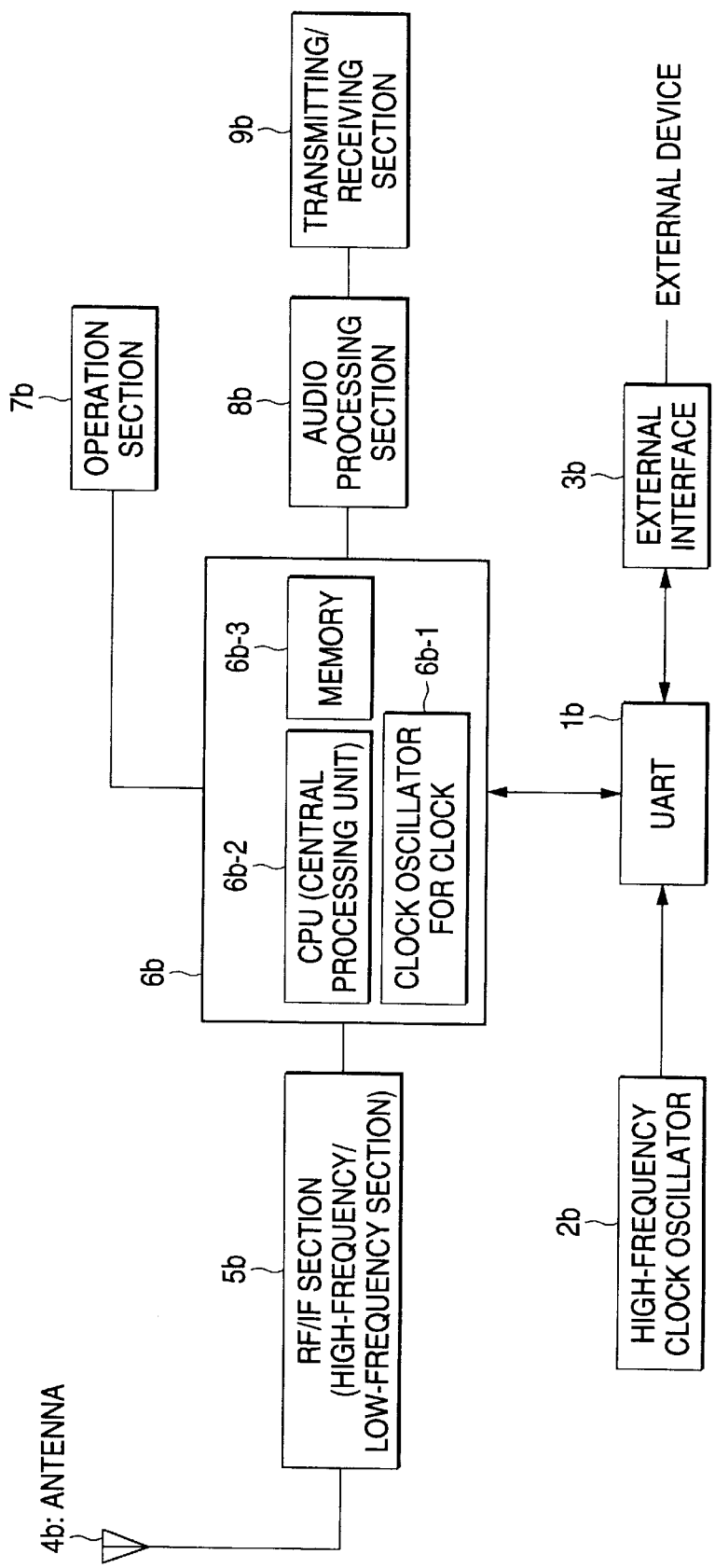
FIG. 6 is a block diagram of the structure of a conventional portable remote terminal apparatus.

Now, description will be given below in detail of an embodiment of a portable remote terminal apparatus according to the invention. Specifically, FIG. 3 is a block diagram of the structure of a portable remote terminal apparatus according to the invention. In this embodiment, a UART $1b$ includes an I/O controller $1b$-1, a baud rate generator $1b$-2, and a communication block $1b$-3, while the UART $1b$ can be driven by the output of a high-frequency clock oscillator $2b$ or a clock oscillator for clock (low-frequency clock oscillator) $6b$-1. The remaining portions of the structure of the present portable remote terminal apparatus are similar to those of the conventional portable remote terminal apparatus shown in FIG. 6, and thus the description thereof is omitted here.

The I/O controller $1b$-1 includes a clock setting register $1b$-1-1 which is used to specify which one of the high-frequency and low frequency clock oscillators is used, and a baud rate setting register $1b$-1-2 used to set a baud rate (transmission speed bps).

The baud rate generator $1b$-2 includes a switching device $1b$-2-1, a decoder $1b$-2-2, and a counter $1b$-2-3: and, in particular, the switching device $1b$-2-1 switches a frequency used according to the setting of the clock setting register $1b$-1-1, the decoder $1b$-2-2 decodes a clock signal and the counter $1b$-2-3 divides the input frequency, so that a given sampling clock and a given baud rate clock can be output.

The communication block $1b$-3 includes a receiving module $1b$-3-1 and a transmission module $1b$-3-2, in which receiving data are received by a buffer (not shown) according to a sampling clock input and are then output to an external interface $3b$, and transmission data are transmitted at a given transmission speed.

Figure 4:
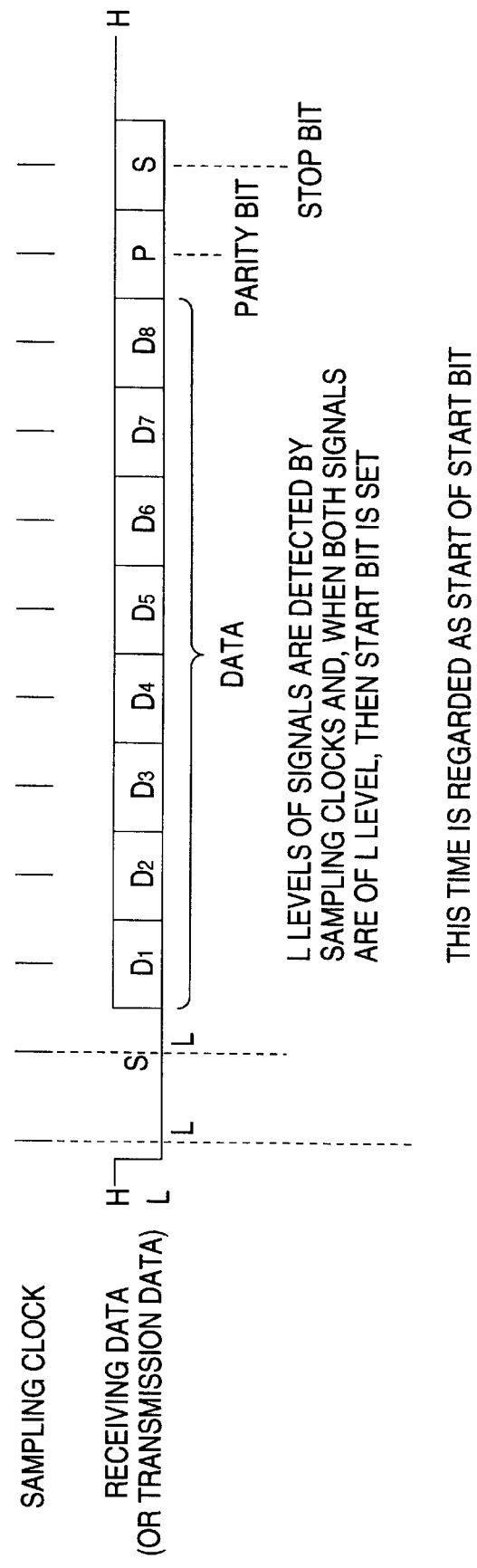
FIG. 4 is an explanatory view of and example of a transmission/receiving data format employed in the invention.

Now, FIG. 4 is an explanatory view of an example of a transmission/receiving data format employed in the invention. As shown in FIG. 4, a start-stop synchronous system is a system in which a start bit and a stop bit are added to given data (in FIG. 4, 8 bits consisting of D1 to D8+a parity bit P) and such combined data are transmitted/received synchronously for every character. Here, as the start bit, there is defined a time when the receiving signal turns into a low (L) level and the L level is confirmed by two sampling clocks. The start bits are respectively sampled in the neighborhood of the center portion thereof by the sampling clocks.

Now, FIG. 5 is a view of degrees of accuracy of baud rates when a dual clock signal is used in combination. As shown in FIG. 5, when a baud rate is 600 bps, the switching device $1b$-2-1 switches the current signal over to the output signal (of 32.768 KHz) of the clock oscillator $6b$-1 for clock and the switching counter $1b$-2-3 divides the frequency of the output signal into 55 sub-frequencies, thereby outputting a given sampling clock and a given baud rate clock. Also, when the baud rate is 2400 bps, similarly, the switching device $1b$-2-1 switches the current signal over to the output signal (of 32.768 KHz) of the clock oscillator $6b$-1 for clock and the switching counter $1b$-2-3 divides the frequency of the output signal into 13.5 sub-frequencies, thereby outputting a given sampling clock and a given baud rate clock. In either of these two cases, the accuracy can be controlled to a range of ±1%. In the remaining baud rates, the signal is switched over to the output signal of the high-frequency clock oscillator $2b$. By the way, when the output signal (32.768 KHz) of the clock oscillator $6b$-1 for clock is used, the operation of the high-frequency clock oscillator $2b$ is stopped, so that the current consumption can be reduced accordingly.

As described above, according to the present embodiment, in a start-stop synchronous transmission system, there is prepared a switching device $1b$-2-1 which switches the output signal of the high-frequency clock oscillator of 12.6 MHz and the output signal of the clock oscillator for clock $6b$-1 of 32.768 KHz over to each other; when the data are transmitted at a baud rate of 600 bps, the frequency of the signal used is divided into 55 sub-frequencies, and when the data are transmitted at a baud rate of 2400 bps, the frequency of the signal used is divided into 13.5 sub-frequencies, thereby generating a sampling clock and a baud rate signal respectively having a given degree of accuracy; and, when the output signal (32.768 KHz) of the clock oscillator $6b$-1 for clock is used, the operation of the high-frequency clock oscillator $2b$ is stopped, thereby being able to reduce the current consumption thereof accordingly.

As has been described heretofore, according to the invention of the second aspect, there can be expected the following excellent effects:

(1) There are provided switching means which can switch the output signals of the low-frequency clock oscillator (32.768 KHz) and high-frequency clock oscillator (12.6 MHz) over to each other according to the data transmission speed, and frequency divider means which can divide the output frequencies of the two clock oscillators; and, when the data are transmitted at given data transmission speeds (600 bps and 2400 bps), the operation of the high-frequency clock oscillator is stopped, the frequency of the output signal of the low-frequency clock oscillator is divided properly by the frequency divider means to thereby generate a sampling clock and a baud rate clock respectively having a degree of accuracy (±1%), so that the current consumption thereof can be reduced accordingly. While the current consumption of the high-frequency clock oscillator is approximately 1 mA, the current consumption of the low-frequency clock oscillator is approximately 10 μA, so that the total current consumption can be reduced down to $\frac{1}{100}$ or so.

(2) The low-frequency clock oscillator is used as an oscillator for a clock and thus it can be realized by a simple circuit configuration and on a small circuit scale.

Embodiment 3

Figure 7:
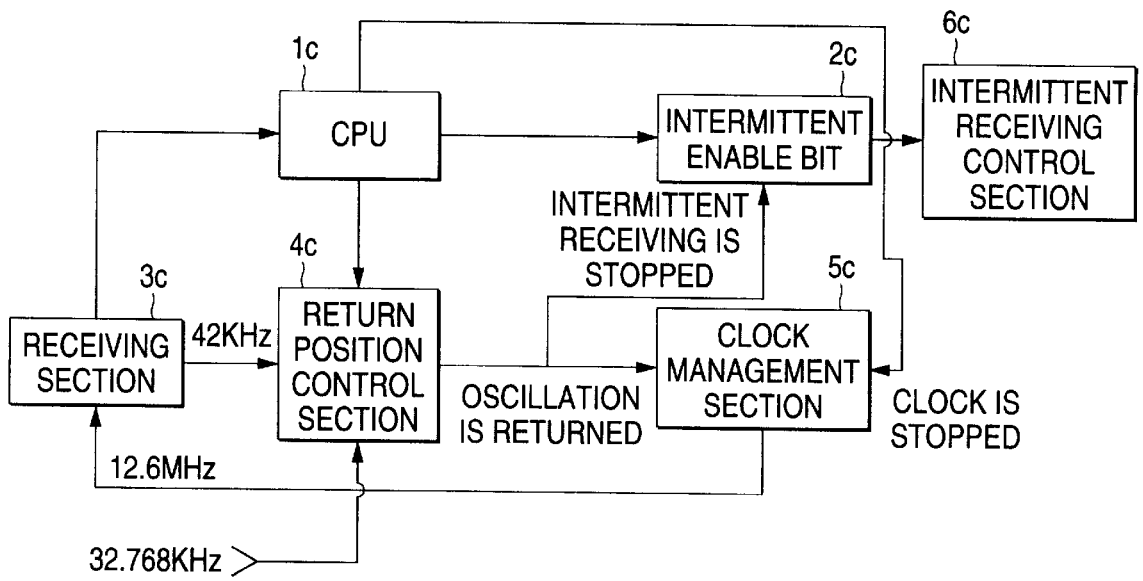
FIG. 7 is a block diagram of the structure of an intermittent control section of a portable remote terminal apparatus according to the invention.
Figure 8:
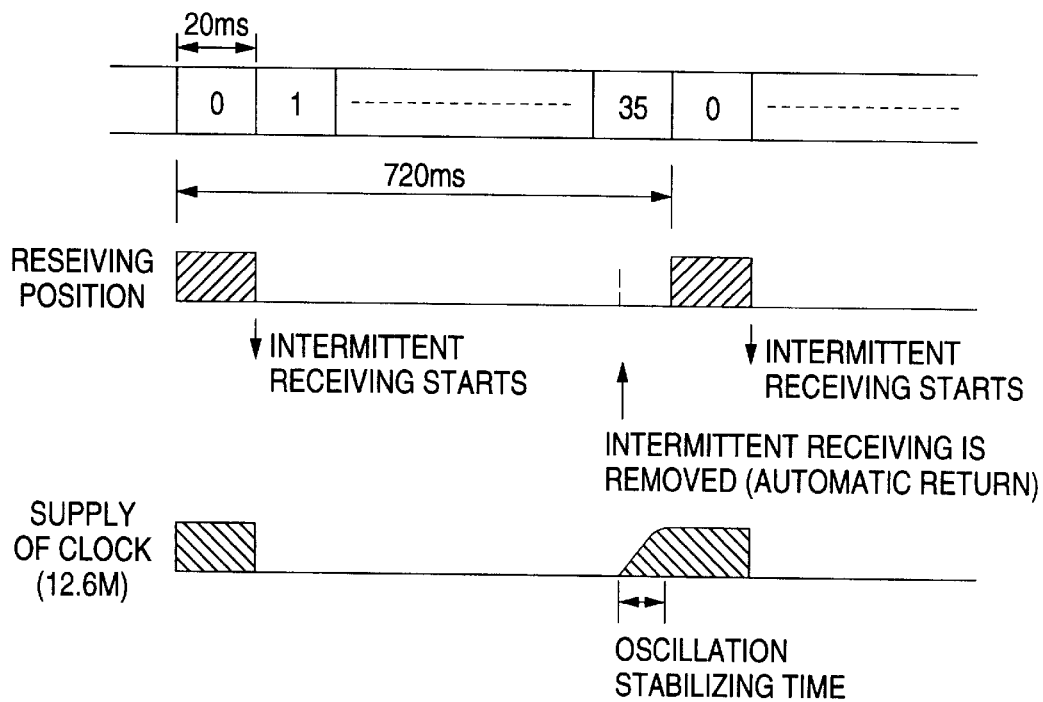
FIG. 8 is a timing chart of an intermittent receiving control timing of the intermittent control section of a portable remote terminal apparatus according to the invention.

Now, description will be given below of an embodiment of a portable remote terminal apparatus according to the invention with reference to the accompanying drawings. In particular, FIG. 7 is a block diagram of the structure of an intermittent control section of an embodiment of a portable remote terminal apparatus according to the invention, and FIG. 8 is a timing chart of an intermittent receiving control timing employed in the present intermittent control section. In FIG. 7, the present intermittent control section comprises a CPU $1c$, an intermittent enable bit $2c$, a receiving section $3c$, a return position control section $4c$, and a clock management section $5c$. To the return position control section $4c$, there are input not only a clock of 42 KHz, which is obtained by frequency dividing a clock of 12.6 MHz output from the clock management section $5c$, but also a clock of 32.768 KHz which is output from a clock oscillator (not shown). Also, in FIG. 8, 1 data frame of a TDMA is set as 720 msec. and the present 1 data frame is composed of 0 to 35 slots (1 slot consists of 20 msec.).

In the above-mentioned structure, when the portable remote terminal apparatus turns into the intermittent receiving state, the CPU outputs an intermittent instruction to the intermittent enable bit 2c to thereby turn or set an intermittent receiving control section 6c into an intermittent mode, simultaneously with this setting, outputs a clock stop instruction to the clock management section 5c to thereby stop the oscillating operation of a clock oscillating source, and further outputs a next slot return position to the return position (see an intermittent receiving removing position shown in FIG. 8) control section 4c to be stored therein, while the CPU itself turns into a sleep mode. For the intermittent receiving, the receiving section 3c, as will be described later in detail, includes a 42 K slot counter for counting a clock of 42 KHz and an auxiliary 32 K slot counter for counting a clock of 32.768 KHz.

During the intermittent receiving operation, since the output of the clock of 42 KHz from the receiving section 3c is stopped, the 32 K slot counter counts the clock of 32.768 KHz to trace the value of the clocks instead of the 42 K slot counter. When the count value of the 32 K slot counter reaches the above-mentioned slot return position, the return position control section 4c outputs an intermittent stop signal to the intermittent enable bit 2c to thereby remove the intermittent mode of the intermittent receiving control section 6c and, at the same time, outputs an oscillation return instruction to the clock management section 5c to thereby operate the clock oscillating source thereof. This return position is set in consideration of an oscillation stabilizing time necessary for the clock oscillation of the clock oscillating source to be stabilized.

The 42 K slot counter and 32 K slot counter of the return position control section 4c are asynchronous to each other and, therefore, as will be described later, the 32 K slot counter is corrected once in 720 msec. (1 data frame) by the clock of 42 KHz from the receiving section 3c. As shown in FIG. 8, receiving is executed only at receiving positions in the 0 to 35 slots, whereas the receiving is stopped at the remaining positions.

As described above, the slot return position is always set by the CPU and, after setting of the slot return position, the CPU turns into the sleep mode, while the intermittent enable bit 2c and the oscillating section of the clock management section 5c are stopped until the present slot return position arrives. Although the clock oscillator of 32.768 KHz is always oscillating, the current consumption thereof is of the order of 10 $\mu$A which is far smaller than the current consumption of 1 mA of the clock management section 5c of 12.6 MHz. Here, as the clock oscillator of 32.768 KHz, there is used an RTC, that is, a clock oscillator for a clock.

Figure 9:
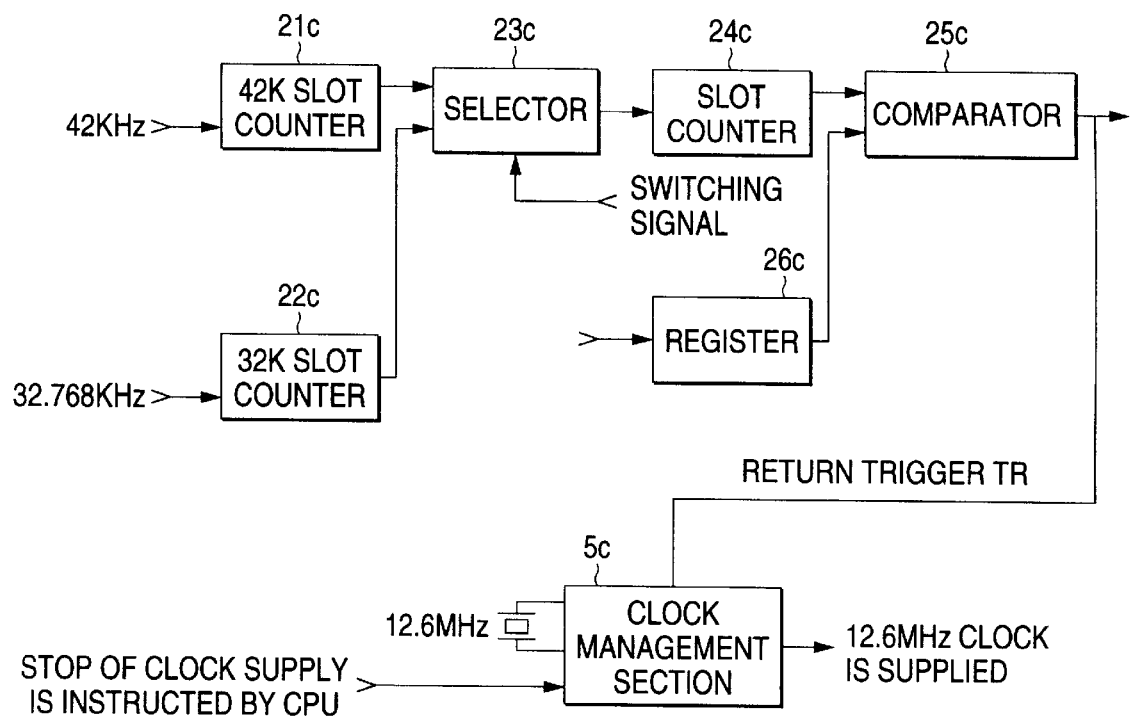
FIG. 9 is a block diagram of the structure of a return position control section of a portable remote terminal apparatus according to the invention.

Now, FIG. 9 is a block diagram of the structure of the return position control section 4c shown in FIG. 7. As shown in FIG. 9, the return position control section 4c comprises a 42 K slot counter 21c, a 32 K slot counter 22c, a selector 23c, a slot counter 24c, a comparator 25c, and a register 26c. In particular, the 42 K slot counter 21c counts clocks of 42 KHz output from the receiving section 3c, and the 32 K slot counter 22c counts clocks of 32.768 KHz output from the above-mentioned clock oscillator for a clock. A switching signal for switching the selector 23c is a signal which is generated simultaneously when the intermittent receiving mode shown in FIG. 8 starts, while the present switching signal is generated by suitable hardware.

At the receiving positions shown in FIG. 8, the 42 K slot counter 21c counts the clocks of 42 KHz from the receiving section 3c and the output thereof is input through the selector 23c into the slot counter 24c. When the portable remote terminal apparatus turns into the intermittent receiving mode, as described above, the CPU 1c outputs the clock stop instruction to the clock management section 5c simultaneously when the intermittent receiving control section 6c is switched into the intermittent mode to thereby stop the clock oscillating source and further store the slot return position into the register 26c.

When the intermittent receiving mode starts, then the switching signal is input to the selector 23c, the output of the 32 K slot counter 22c is input through the selector 23c into the slot counter 24c, and the output of the slot counter 24c is input to the comparator 25c. The comparator 25c compares the thus input output of the slot counter 24c with the slot return position set in the register 26c and, if the output of the slot counter 24c reaches the return position, then the comparator 25c outputs a return trigger TR to the clock management section 5c. In response to this, the clock management section 5c is actuated and, after the passage of the oscillation stabilizing time (see FIG. 8), supplies a clock signal of 12.6 MHz to the receiving section 3c. As a result of this, the portable remote terminal apparatus is switched over to the receiving state.

Figure 10:
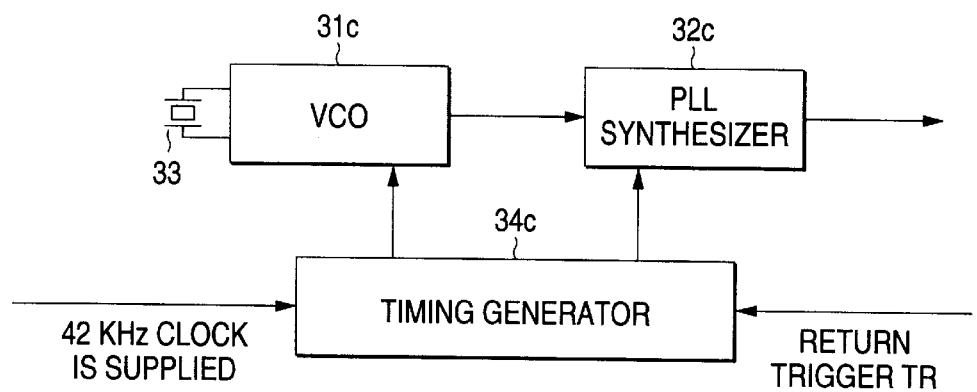
FIG. 10 is a block diagram of the structure of another structure block including a clock oscillating source employed in a portable remote terminal apparatus according to the invention.

Now, FIG. 10 is a block diagram of the structure of a power source control management section of another structure block including a clock oscillating source using the above-mentioned return trigger TR. As shown in FIG. 10, a VCO 31c and a PLL synthesizer 32c respectively include clock oscillating sources each of which has an oscillating element 33c. And, the PLL synthesizer 32c supplies a clock to another structure block. In this case, if the oscillating source is operated and remains in the operation state even when it is not necessary to supply the clock to another structure block, then the power of the battery serving as the drive power source of the portable remote terminal apparatus is to be consumed wastefully.

In view of the above, there is provided a timing generator 34c. That is, if a clock of 42 KHz from the receiving section 3c is input and the intermittent receiving mode starts, then the timing generator 34c switches a power source control signal $V_{VCO}$ and a power source control signal $V_{PLL}$ into L (low) levels at a given timing in the VCO 31c and PLL synthesizer 32c, thereby stopping the supply of clock signal to the other structure block. And, if the above-mentioned trigger TR is output at the return position (the receiving position shown in FIG. 8), then the power source control signal $V_{VCO}$ and power source control signal $V_{PLL}$ are respectively switched over to H (high) levels to actuate the VCO 31c and PLL synthesizer 32c, thereby supplying the clock signal to the other structure block. Due to this, during the intermittent receiving operation, the operation of the structure block including the clock oscillating source is caused to stop, thereby being able to reduce the power consumption of the battery serving as the drive power source of the portable remote terminal apparatus.

Figure 11:
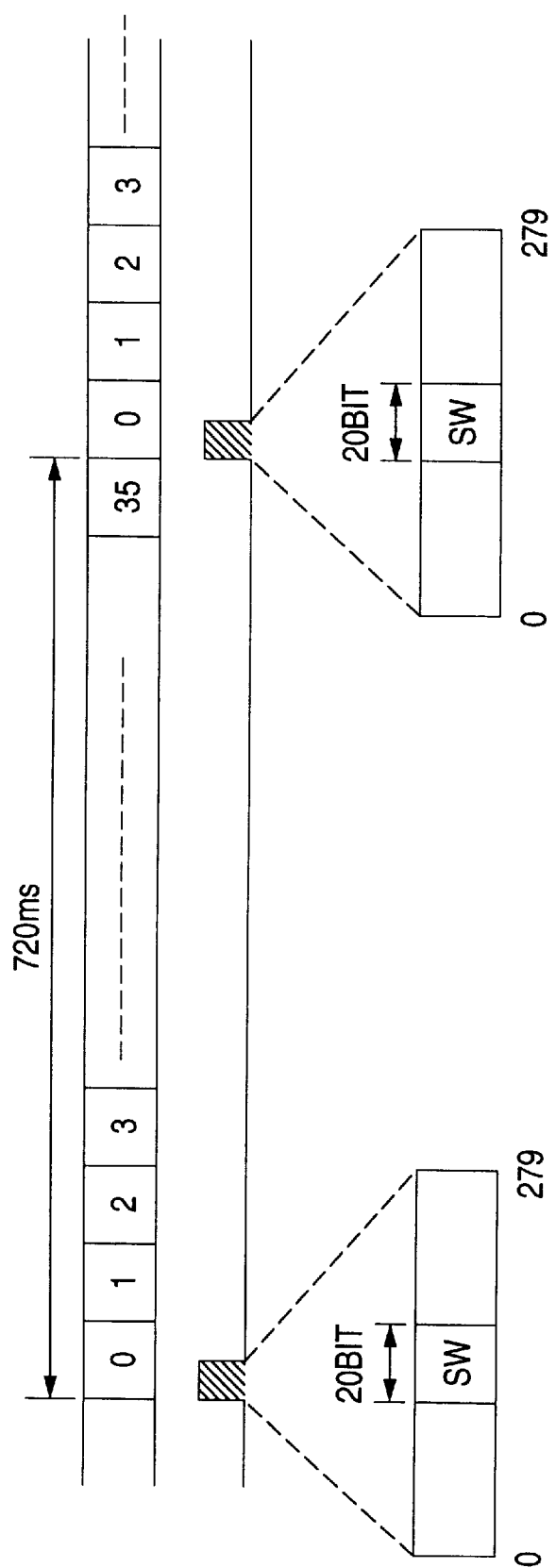
FIG. 11 is an explanatory view of a method for correcting a lag between a 42K slot counter and a 32K slot counter.

Now, FIG. 11 is an explanatory view of a method for correcting a lag between the 42 K slot counter 21c and 32 K slot counter in the above-mentioned intermittent receiving operation. As described before, since the clock of 42 KHz and clock of 32.768 KHz are asynchronous to each other, there is produced a lag between the 42 K slot counter 21c and 32 K slot counter 22c. As shown in FIG. 11, a unique pattern SW is included in a 20-bit synchronous word of a receiving slot. The synchronous word is detected every bit in order to be able to detect the above bit and, when the unique pattern SW is detected, if the above correction is made, then the lag between the 42 K slot counter 21c and 32 K slot counter 22c can be corrected. The receiving slot of the unique pattern SW is included in 117 to 137 bits. Although there exists a tolerance of ±1 bit, when such bit is detected, a lag between the 42 K slot counter 21c and 32 K slot counter 22c is corrected.

Figure 12:
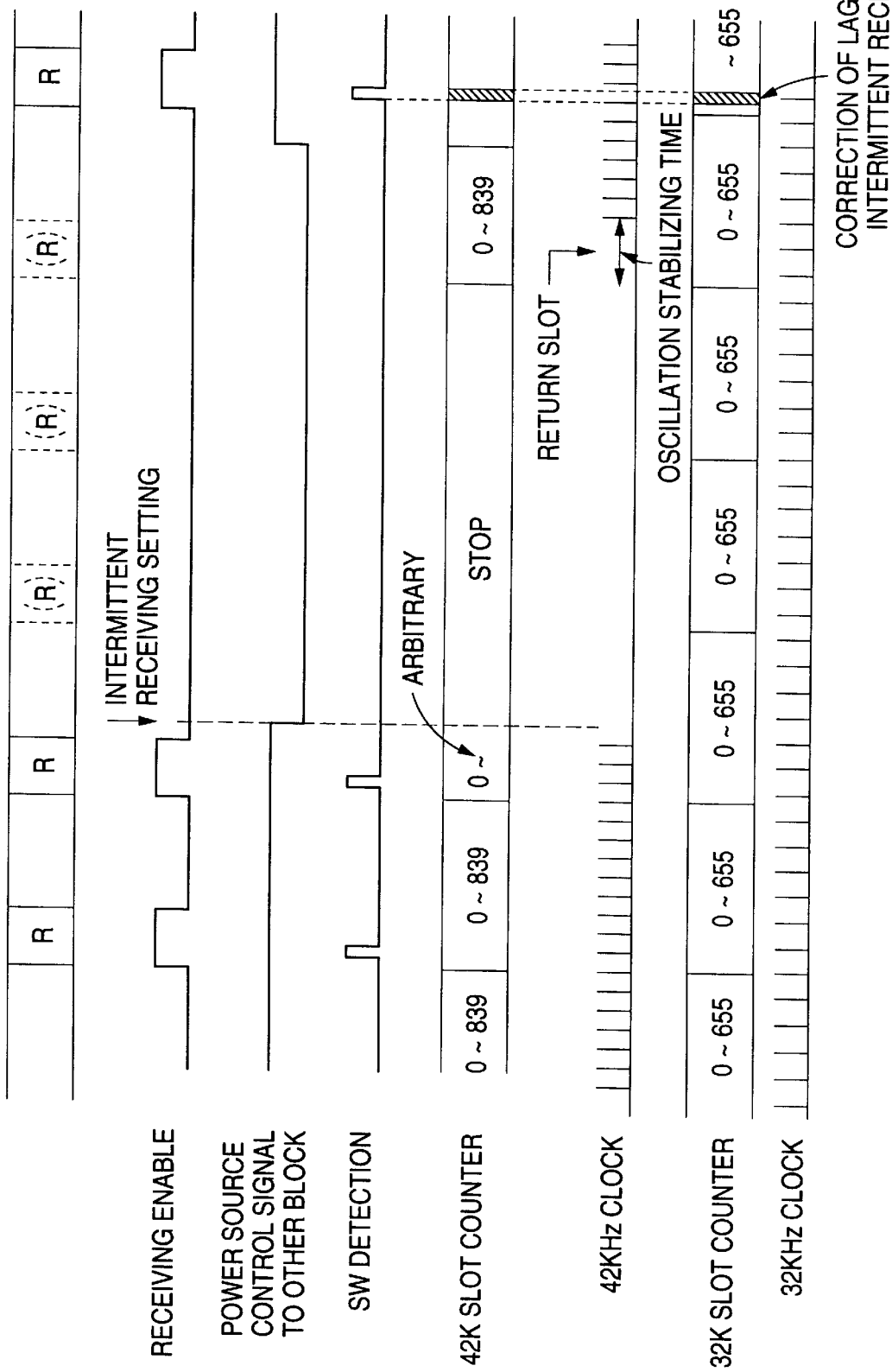
FIG. 12 is a timing chart of the operation timing of a portable remote terminal apparatus according to the invention.
Figure 13:
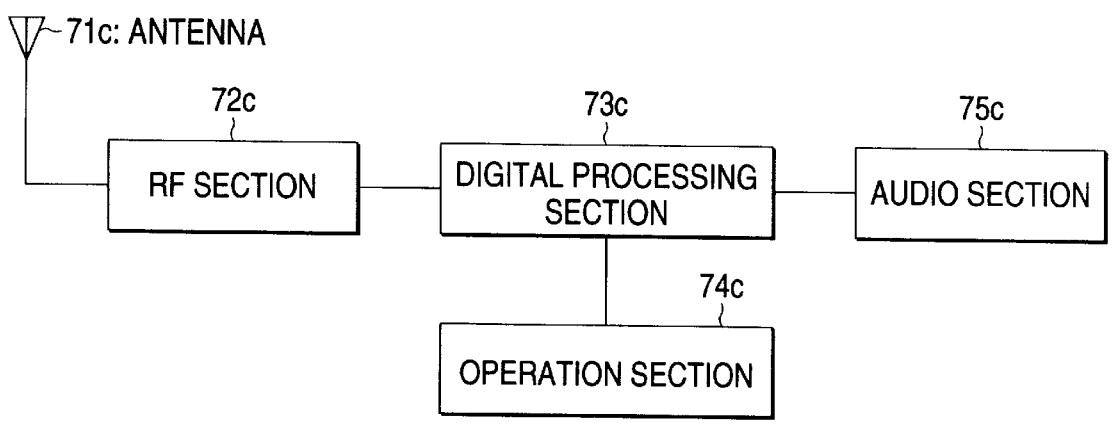
FIG. 13 is a block diagram of the structure of an ordinary portable remote terminal apparatus according to the prior art.

Now, FIG. 12 is a timing chart of the operation timings shown in FIGS. 8 and 10. As shown in FIG. 12, the intermittent receiving state set by the CPU 1c as well as the receiving enable (the output of the intermittent enable bit 2c shown in FIG. 7) cause the power source control signals (that is, the power source control signal $V_{VCO}$ and power source control signal $V_{PLL}$ shown in FIG. 10) to the other structure block to turn into their respective low levels, thereby stopping the oscillating source of the clock management section 5c, so that the 42 KHz clock and 42 K slot counter are caused to stop. Also, the 32 K slot counter is allowed to count the 32 KHz clocks and, instead of tracing by the 42 K slot counter, the 32 K slot counter is allowed to trace the values of the clocks. And, if the clock counter value reaches the return position set by the CPU 1c, then the oscillating source is returned and, after the passage of the oscillation stabilizing time of the oscillating source, the 42 KHz clock is supplied. Further, when the unique pattern SW is detected, then the lag between the 42 K slot counter and 32 K slot counter is corrected.

As has been described heretofore, according to the invention of the third aspect, since the high-frequency clock oscillating source is stopped during the intermittent receiving operation, the power consumption of the portable remote terminal apparatus can be controlled down to a low consumption level.

Also, according to the invention of the fourth aspect, because the clock oscillation of the other block is also stopped during the intermittent receiving operation, the power consumption of the portable remote terminal apparatus can be controlled down to a further low consumption level.

What is claimed is:

1. A portable remote terminal apparatus comprising:
   a clock oscillator for generating a high-frequency clock signal;
   a CPU switching between a normal operating mode and a sleep mode in response to the high-frequency clock signal;
   an input device;
   an input detecting circuit for detecting an input from the input device; and
   an interrupt controller connected to the input detecting circuit,
   wherein when the portable remote terminal apparatus enters an intermittent receiving state, the CPU outputs a stop signal to stop the operation of the clock oscillator to switch the CPU into the sleep mode, and
   wherein in response to detecting an input signal from the input device, the input detecting circuit transmits the input signal to the CPU and outputs a signal to the interrupt controller, the interrupt controller activates the clock oscillator in response to the signal from the input detecting circuit, and the CPU switches to the normal operating mode in response to the clock signal from the clock oscillator.

2. A portable remote terminal apparatus comprising:
   a low-frequency clock oscillator for generating a first clock signal for clock;
   a high-frequency clock oscillator for generating a second clock signal for data transmission; and
   a start-stop synchronous data transmission and receiving device operable to transmit and receive data at a plurality of transmission speeds, comprising:
   a data transmission control device for setting the data transmission speed; and
   a switching device for selecting the output of one of the low-frequency and the high-frequency clock oscillators according to the transmission speed set by the data transmission control device,
   wherein when the transmission speed is set at a predetermined speed, the start-stop synchronous data transmission and receiving device stops the operation of the high-frequency clock oscillator, and selects the output of the low-frequency clock oscillator for use in data transmission.

3. The apparatus of claim 2, further comprising a frequency divider for dividing the frequency of the low-frequency clock to generate a sampling clock and a baud rate clock when the transmission speed is set at the predetermined speed, the sampling clock and the baud rate clock each having a predetermined degree of accuracy.

4. A portable remote terminal apparatus comprising:
   a CPU operable in a normal mode and a sleep mode in response to the first clock signal from the high-frequency oscillator;
   a low-frequency clock oscillator for generating a first clock signal; and
   a control section for switching the operation of the apparatus between an intermittent state and a normal state, the control section comprising:
   an intermittent enable bit;
   a clock management section including a high-frequency clock oscillator for generating a second clock signal having a frequency higher than that of the first clock signal;
   a receiving section for dividing the frequency of the second clock signal; and
   a return position control section,
   wherein when the portable remote terminal apparatus enters an intermittent receiving state, the CPU sets the intermittent enable bit to an intermittent state, sets a return timing in the return position control section, the return timing being set at least partly based on an oscillation stabilizing time of the high-frequency clock oscillator, and stops the operation of the high-frequency oscillator so the CPU turns into the sleep mode, and
   wherein when the apparatus is in the intermittent receiving state, the return position control section resets the intermittent enable bit and starts the operation of the high-frequency oscillator to return the CPU from the sleep mode to the normal mode based on the return timing set by the CPU and the first clock signal generated by the low-frequency clock oscillator.

5. The apparatus of claim 4, wherein the return position control section comprises a selector for selecting between the first and second clock signals, a slot counter that counts the selected clock signal, a register for storing the return timing set by the CPU, and a comparator for comparing the output of the slot counter with the return timing stored in the register to generate a return trigger signal for the clock management section.

6. The apparatus of claim 5, wherein the clock management section comprises a VCO having an oscillating element, a PLL synthesizer coupled to the VCO, and a timing generator for controlling the VCO and the PLL synthesizer, wherein the timing generator turns off the VCO and the PLL synthesizer in response to a signal from the CPU, and turns on the VCO and the PLL synthesizer in response to the return trigger signal from the return position control section.

* * * * *